United States Patent [19]

Matsubara et al.

[11] Patent Number: 4,741,580

[45] Date of Patent: May 3, 1988

[54] ANTI-SKID CONTROL SYSTEM FOR MOTOR VEHICLE

[75] Inventors: Yuji Matsubara, Kazo; Hiroshi Ikegami, Kuki; Hideo Akima, Yokohama; Akira Hoashi, Kawasaki; Katsuya Miyake, Ageo; Isao Yamaki, Iwatsuki; Toshifumi Maehara, Saitama, all of Japan

[73] Assignees: Akebono Brake Industry Co., Ltd., Tokyo; Fujitsu Limited, Kanagawa, both of Japan

[21] Appl. No.: 890,611

[22] Filed: Jul. 30, 1986

[30] Foreign Application Priority Data

Aug. 2, 1985 [JP] Japan .................. 60-170913
Dec. 27, 1985 [JP] Japan .................. 60-292997

[51] Int. Cl.[4] ..................... B60T 8/70; B60T 8/68
[52] U.S. Cl. ..................... 303/105; 303/106; 303/109; 364/426
[58] Field of Search ............ 188/181 A; 303/103, 303/105, 107, 109, 110, 111, 97, 106; 364/426

[56] References Cited

U.S. PATENT DOCUMENTS

| | | | |
|---|---|---|---|
| 4,006,942 | 2/1977 | Saito .................. | 303/109 |
| 4,209,203 | 6/1980 | Brearley .................. | 303/110 |
| 4,270,810 | 6/1981 | Ruhnau et al. .................. | 303/110 |
| 4,395,761 | 7/1983 | Sato et al. .................. | 364/426 |
| 4,585,280 | 4/1986 | Leiber .................. | 303/110 |

*Primary Examiner*—Andres Kashnikow
*Assistant Examiner*—Timothy Newholm

[57] ABSTRACT

In an anti-skid control system for a motor vehicle, brake fluid pressure reduction-control mode and brake fluid pressure buildup-control mode occurs cyclically; in the reduction-control mode, reduction of the brake fluid pressure is started on the basis of detection of an abrupt drop in wheel speed which occurs when the wheel is braked; and in buildup-control mode, a valve is repetitively opened and closed so that brake fluid pressure buildup and holding operations are performed alternatley and repetitively, whereby the brake fluid pressure is caused to build up gradually. The length of time period for the first buildup operation in the buildup-control mode is determined on the basis of variation in the wheel speed occurring between a low peak point and a high peak point; and the length of time period for at least one of each pressure holding operation and each of the second and succeeding pressure buildup operations in the abovementioned buildup-control mode, is determined on the basis of variation in the wheel speed occurring immediately before the pressure holding or buildup operation is started.

5 Claims, 7 Drawing Sheets

ANTI-SKID CONTROL SYSTEM FOR MOTOR VEHICLE

BACKGROUND OF THE INVENTION

1. Field of the Invention

This invention relates to an anti-skid control system for achieving satisfactory rotational behavior of wheels of a motor vehicle during braking operation. More particularly, this invention pertains to an anti-skid control system which is designed so that brake fluid pressure reduced to prevent the wheels from being locked can be increased in a desirable manner.

Furthermore, the present invention is also directed to an anti-skid control system capable of preventing anti-skid wheel locking which tends to occur when the coefficient of friction between the wheels and the road surface is very low, i.e., when the motor vehicle is running on a road surface with a very low coefficient of friction.

2. Description of the Prior Art

There have heretofore been proposed a variety of anti-skid control systems wherein during braking operation, the brake fluid pressure is reduced to prevent occurrence of such an undesirable wheel braking condition as to cause wheel lock, and the brake fluid pressure thus reduced is now increased to avoid an undesirable extension of the brake stopping distance. Among such conventional anti-skid control systems is one wherein different pressure buildup rates are stored; a desired one of the stored pressure buildup rates is selected; and brake fluid pressure is increased with the selected buildup rate, for example. As concrete means for effecting the pressure buildup rate selection, a system has also been proposed wherein a solenoid-operated valve adapted to be opened and closed with a relatively high frequency is provided in the brake fluid pressure buildup system; a pulse train generator such as multivibrator is provided in the drive system for the solenoid-operated valve; and the timing with which the aforementioned solenoid-operated valve is driven by a pulse train signal derived from the multivibrator, is controlled on the basis of a signal representing wheel acceleration (British Patent Specification No. 1305430).

However, more satisfactory anti-skid control is hardly achievable with the aforementioned conventional system wherein anti-skid control operation is performed through the opening and closing of a solenoid-operated valve which is driven by a pulse train signal either with a single average pressure buildup rate or with one selected from several different pressure buildup rates. This will also be understood from what is mentioned below. The decrease and recovery of the wheel speed requiring anti-skid control is influenced by various factors such as the conditions of the road surface on which the motor vehicle is running, the coefficient of friction of the road surface, the vehicle running speed, the brake operating condition, the tire surface condition, the internal pressure of the tire tube, and so forth, and the overall effect of these factors is always changing in succession. However, any of the above-described conventional systems fails to respond quickly enough to cope with such a situation. This difficulty becomes most remarkable with brake fluid pressure buildup mode in anti-skid control which requires that delicate balance be achieved between two contradictory requirements, i.e., the requirement that occurrence of re-locking of a wheel be restrained as effectively as possible and the requirement that any undesirable extension of the brake stopping distance be prevented.

SUMMARY OF THE INVENTION

Accordingly, it is an object of the present invention to provide an anti-skid control system which is designed that brake fluid pressure reduced can be increased in quick response to the actual rotational behavior of a wheel on a motor vehicle.

Another object of the present invention is to provide an inexpensive and highly reliable anti-skid control system which is designed so that buildup of brake fluid pressure in quick response to rotational behavior of a wheel is achieved with simplified construction.

According to an aspect of the present invention, there is provided an anti-skid control system wherein brake fluid pressure reduced in response to detection of an abrupt drop in the wheel speed which occurs when brake is applied, is repetitively held and increased through opening and closing of a solenoid-operated valve so that the brake fluid pressure is increased with a slow rate, characterized in that the length of the pressure buildup time period and/or the length of the pressure holding time period is determined on the basis of variations in the wheel speed which occurred prior to the pressure buildup control and/or pressure holding control. The system according to the present invention may be most satisfactorily be realized in such a manner that the brake pressure buildup mode in anti-skid control is divided into two stages, i.e., a former stage that the first pressure buildup after a high peak of the wheel speed was detected, is effected and a latter stage that pressure buildup operation and pressure holding operation are alternately and repetitively performed from the time when the first pressure buildup is effected to the time when the next abrupt drop in the wheel speed is detected; and in the former pressure buildup stage, the pressure build time period is determined based on variations in the wheel speed from low peak to high peak, and in the latter pressure buildup stage, the length of each of the pressure holding and buildup time periods is determined based on the wheel deceleration occurring immediately prior to such period, respectively.

As will be appreciated from the above discussion, with the anti-skid control system of the present invention, sufficient recovery of the wheel speed can be achieved by effecting brake fluid pressure buildup after the wheel speed has passed a high peak point; subsequent brake fluid pressure buildup and holding time periods are repeated so that the brake fluid pressure is increased after all; and the length of each of the brake fluid pressure buildup and holding time periods is determined on the basis of the wheel deceleration occurring immediately prior to that period, so that the brake fluid pressure buildup is effected in quick response to the actual condition of the wheel speed. The present system is highly advantageous over the conventional systems in the above points.

The reason why the brake fluid pressure buildup mode is effected in the two stages, i.e., the former pressure buildup stage and the latter pressure buildup stage, is as follows:

That low peak and high peak occur in the wheel speed while brake fluid pressure as reduced is being held, indicates that the braking force is short. Furthermore, the time interval between the low peak point and the high peak point depends on the friction of the wheel with respect to the road surface and the shortage of the braking force.

Thus, according to the present invention, the former pressure buildup stage in the pressure buildup mode is set up such that the shortage of the braking force is determined from variations in the wheel speed between a low peak point and a high peak point and the brake fluid pressure is increased by an amount corresponding to the shortage of the braking force.

The length of pressure buildup time period in the former pressure buildup stage may be determined by various methods. In one of those methods, the difference $(V_a-V_{LP})$ between the wheel speed $V_a$ when the brake pressure is reduced and the wheel speed $V_{LP}$ at a low peak point, is sought, $K_1 \times 100\%$ and $K_2 \times 100\%$ of $(V_a-V_{LP})$ are calculated, where $0<K_1<K_2<1$; the time length $\Delta T$ between the wheel speed $V_{LP}+K_1(V_a-V_{LP})$ occurs and the time when the wheel speed $V_{LP}+K_2(V_a-V_{LP})$ occurs, is detected; and the length of the aforementioned pressure buildup time period is determined on the basis of the time interval $\Delta T$ thus detected. In this case, the determination of the length of the pressure buildup time period can be achieved by performing arithmetic operations by using equations set up in an arithmetic unit or by reading out time information previously stored in a store. The length of the pressure buildup time period in the former stage can also be determined by a method using the time period between a low peak and a high peak of the wheel speed, by a method using a result obtained by sampling the wheel speed in terms of short time intervals, or by any other suitable method.

The pressure buildup control in the former stage described above is performed in relation to sufficient recovery of the wheel speed which is achieved without increasing the brake pressure before the wheel speed reaches a high peak. It will be appreciated, however, that the above-mentioned latter pressure buildup stage wherein pressure hold and increasing periods are repeated as mentioned above, is based on a different principle from that of the former stage.

Due to the pressure buildup produced as a result of the former pressure buildup stage, the shortage of the braking force is eliminated so that the wheel is braked with a braking force compatible with the road surface and thus the wheel speed decreases gradually as the vehicle speed decreases. In anti-skid control, however, it is desirable that an extension of the brake stopping distance be avoided by increasing the braking force as greatly as possible in so far as no abrupt decrease in the wheel speed occurs again. During anti-skid control operation, any variation in the wheel speed condition occurs with a certain delay with respect to the conformation or adaptation of the wheel to the road surface, and the wheel speed rarely represents stable variation. Thus, in the latter pressure buildup stage of the brake fluid pressure buildup mode according to the present invention, the wheel speed conditions which occur during short periods are detected, and based on information resulting from such detection, the brake fluid pressure is increased within a required range so that the braking force is gradually increased, whereby the brake stopping distance is shortened.

As will be appreciated from the above discussion, the length of each pressure holding or buildup time period in the latter pressure buildup stage is determined based on information obtained by detecting the wheel deceleration occurring immediately before said each pressure holding or buildup time period. The detection of the wheel deceleration can be effected by various methods. Among the methods are a method wherein the wheel deceleration is detected either at the predetermined termination point of the preceding period or at a point immediately before the termination point; a method wherein a result obtained by sampling the wheel deceleration in terms of short time periods is successively registered and updated; a method wherein computation is performed on the basis of the decrease in the wheel speed occurring during the preceding period; and so forth.

The determination of the length of each pressure holding or buildup time period in the latter pressure buildup stage is also possible by employing a method wherein arithmetic operations are performed by using equations set up in an arithmetic unit, a method wherein time information is read out of a store, or any other suitable method.

Other objects, features and advantages of the present invention will become apparent from the ensuing description taken in conjunction with the accompanying drawings.

DESCRIPTION OF THE PREFERRED EMBODIMENTS

Figure 1:
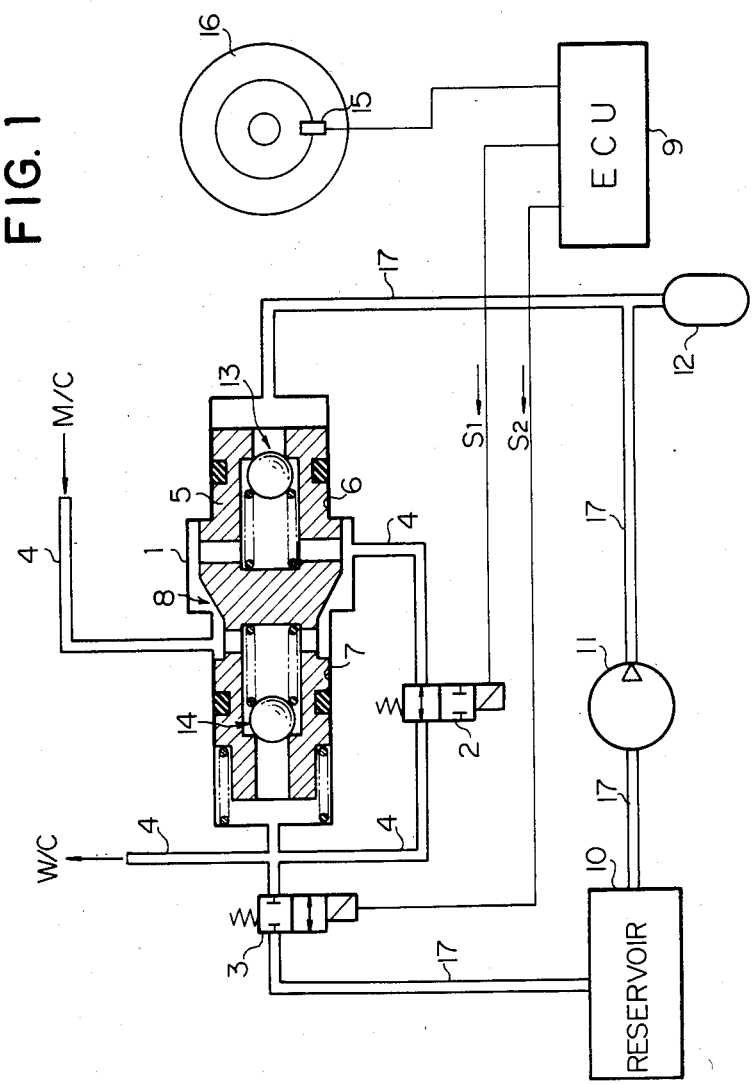
FIG. 1 is a diagrammatic view of an anti-skid control apparatus to which the present invention is applicable.

Referring to FIG. 1, there is illustrated an anti-skid control apparatus to which the present invention is applicable, which includes a gate valve 1, pressure buildup-holding solenoid-operated valve (referred to simply as first valve hereinafter) 2, pressure-reducing solenoid-operated valve (referred to simply as second valve hereinafter) 3, brake fluid pressure transmitting main passage 4 extending from a master cylinder M/C (not shown) to wheel cylinders of wheel brake devices (now shown) through the gate vavle 1 and first valve 2, and so forth.

The gate valve 1 includes cylinders 6 and 7 containing a differential pressure-responsive piston 5 and is arranged such that a valve portion 8 of the gate is closed in response to the piston 5 being displaced, to the left as viewed in the drawing, due to a differential pressure. Upon closure of the valve portion 8, the pressure transmitting main passage 4 extending between the master cylinder and the wheel cylinders is interrupted.

The first valve 2, which is normally open, is closed in response to a brake fluid pressure holding signal $S_1$ derived from a control circuit 9, and thereupon the brake fluid pressure transmitting main passage 4 is interrupted so that a brake fluid pressure holding condition is established.

The second valve 3, which is normally closed, is opened in response to a pressure-reducing signal $S_2$ also derived from the control circuit 9, and thereupon pressure fluid in the wheel cylinder is pumped into an accumulator 12 by means of a pump 11 through a reservoir 10 and the thus pumped pressure fluid is returned between the gate valve 1 and the first valve 2 through a by-pass passage 17. Indicated at 13 and 14 are a check valve and relief valve, respectively.

Wheel velocity detector or speed sensor indicated at 15 is associated with a wheel 16 and arranged to provide detected information to the control circuit 9.

Figure 2:
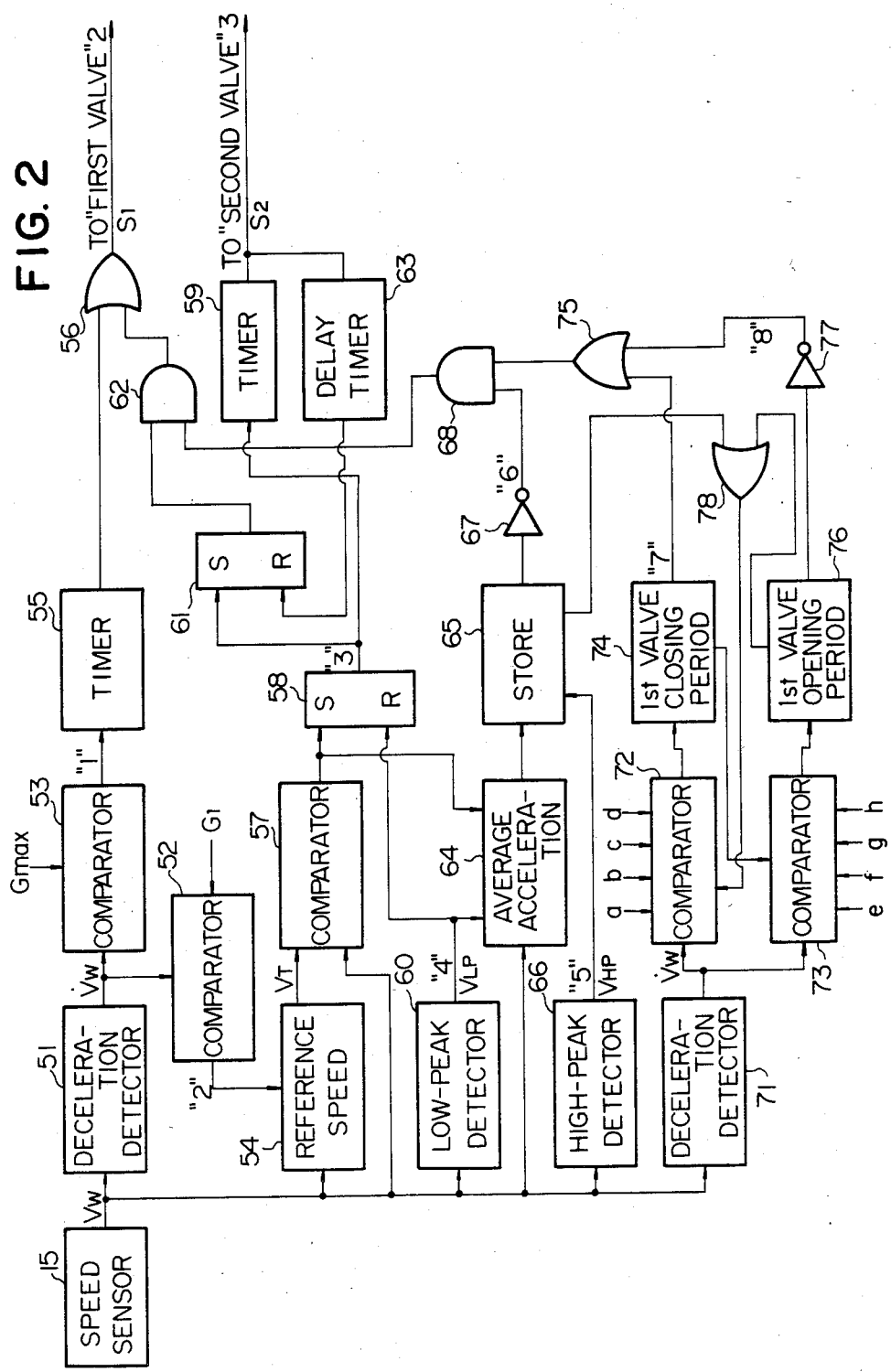
FIG. 2 is a functional block diagram of the control circuit according to an embodiment of the present invention which is usable with the apparatus of FIG. 1.

The control circuit 9 comprises a microcomputer and is equipped with such functions as shown in the block diagram of FIG. 2.

The operation of the anti-skid control system of FIG. 1 which includes the control circuit of FIG. 2 will now be explained with reference to FIG. 3.

Figure 3:
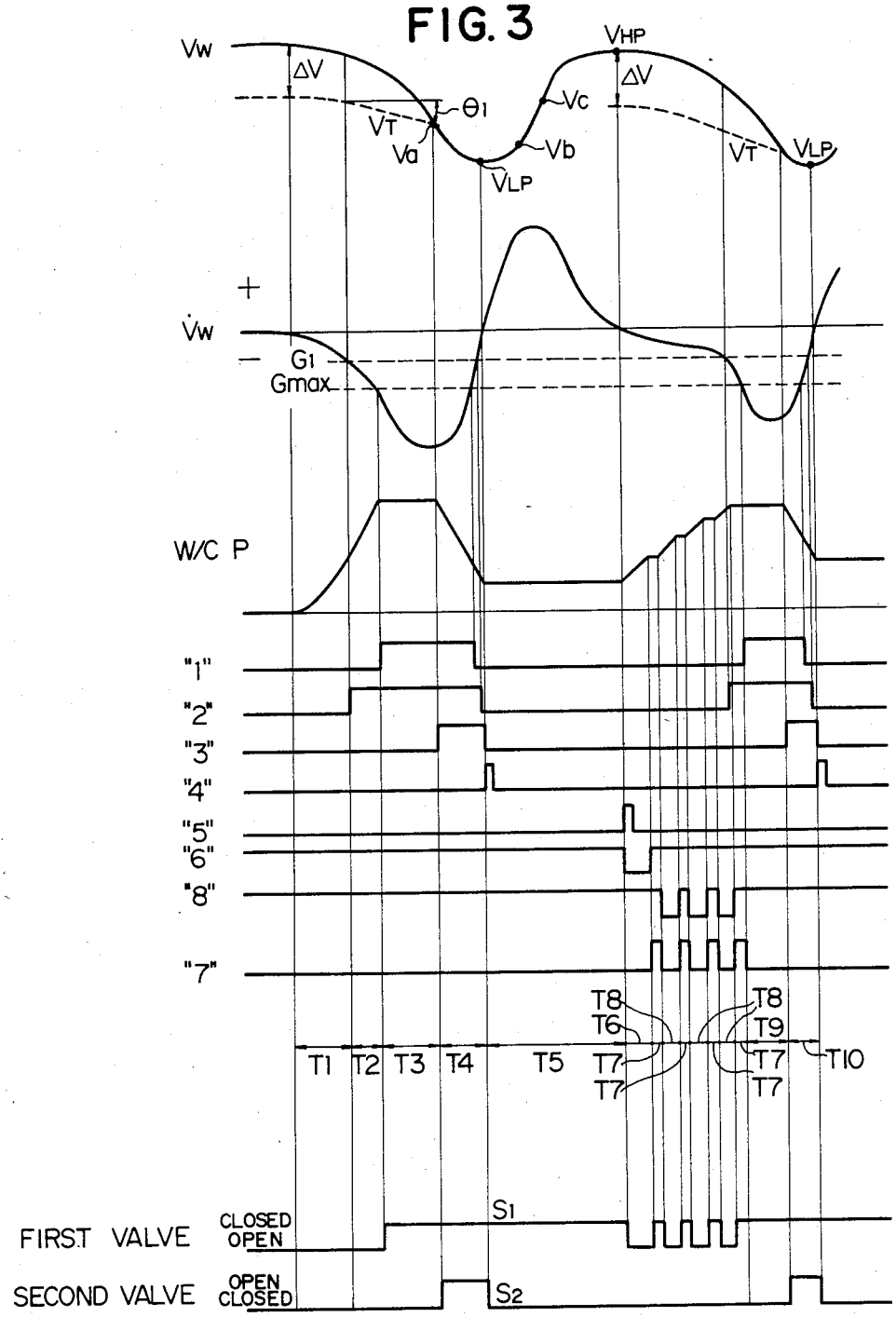
FIG. 3 is a view useful for explaining the operation of the circuit shown in FIG. 2.

Referring to FIG. 3, there are shown the wheel speed $V_W$, wheel deceleration $\dot{V}_W$, brake fluid pressure within the wheel cylinder W/C of the brake system, signals "1" to "8" which occur in the circuit of FIG. 2, and opening and closing timing of the first and second valves 2 and 3.

Typically, during time periods $T_1$ to $T_9$ shown in FIG. 3, the below-described control operations are performed by the control circuit of FIG. 2 in accordance with variation in the wheel speed $V_W$ detected by the speed sensor 15 shown in FIGS. 1 and 2. Wheel deceleration $\dot{V}_W$ is determined in a wheel deceleration determining unit 51 (FIG. 2) on the basis of the wheel speed $V_W$. The wheel deceleration $\dot{V}_W$ thus determined is then compared with a preset threshold level $G_1$ in a first comparator 52 and also with another preset threshold level $G_{max}$ in a second comparator 53.

Time period $T_1$: The brake fluid pressure P builds up so that the wheel deceleration $\dot{V}_W$ increases gradually. Reference velocity $V_T$, which will be described below, varies following the wheel speed $V_W$ with a speed difference equal to a predetermined value $\Delta V$ maintained therebetween.

The reference velocity $V_T$ is determined, based on the wheel speed $V_W$, in a reference velocity determination unit 54 (FIG. 2) which is controlled based on the output of the first comparator 52 in such a manner that the reduction rate of the reference velocity $V_T$ does not exceed a predetermined value $\theta_1$ which corresponds to the threshold level $G_1$. The wheel speed $V_W$ and reference velocity $V_T$ are compared in a third comparator 57; and when the relationship $V_W = V_T$ holds, the output signal of the third comparator 57 is passed to set a flip-flop 58.

Time period $T_2$: When the wheel deceleration $\dot{V}_W$ reaches the threshold level $G_1$, an output signal "2" is derived from the first comparator 52, and the reference velocity $V_T$ decreases with the constant gradient $\theta_1$.

Time period $T_3$: As the wheel deceleration $\dot{V}_W$ further increases, it reaches the threshold level $G_{max}$, and thereupon the second comparator 53 provides an output signal "1" which in turn is passed through a first timer 55 and first OR gate 56 to close the first valve 2.

As will be appreciated, the threshold level $G_{max}$ is preset to prevent the brake fluid pressure P from further building up when the wheel deceleration $\dot{V}_W$ increases beyond this threshold level.

At the beginning of the time period $T_3$, the master cylinder M/C is isolated from the wheel cylinder W/C so that the brake fluid pressure P prevailing within the wheel cylinder W/C is held. In case $G_{max}$ is not detected even when a preset time elapses after the time when the signal "1" appeared, the timer 55 operates to block the signal "1".

Time period $T_4$: When the wheel speed $V_W$ and reference velocity $V_T$ become equal to each other, the first flip-flop 58 is set and provides an output signal "3" which in turn is passed through a second timer 59 to cause the second valve 3 to be opened so that the brake fluid pressure P within the wheel cylinder W/C is reduced.

In case the output signal "3" still exists when a preset time elapses after the time when this signal appeared, the second timer 59 operates to block the signal "3", thus causing the second valve 3 to be closed. In this way, the pressure reduction is prevented from being continued more than needed.

Time period $T_5$: When the wheel speed $V_W$ reaches a low peak $V_{LP}$, then a low peak detector 60 provides an output signal "4" which in turn is passed to reset the first flip-flop 58. Consequently, the output signal "3" disappears, and thus the second valve 3 is closed.

A second flip-flop 61 is provided which is set by the signal "3". Output signal of the second flip-flop 61 is provided to the first valve 2 through a first AND circuit 62 and the first OR circuit 56. The flip-flop 61 is arranged to be reset, when a preset period of time elapses from the time when the first valve 2 was closed, by the output of a timer 63 which is enabled to start its operation by the output signal "3"; with this arrangement, the anti-skid control system can be returned to its initial condition. This is based on the fail-safe concept, and the time period preset in the timer 63 is selected to be sufficiently larger than one control cycle (the period from the time when pressure reduction is caused to the time when pressure reduction is caused next).

As the consequence of the above-described operations, the brake fluid pressure P within the wheel cylinder W/C is held, reduced and again held, and the pressure holding operation performed during the time period $T_5$ is continued until a high peak of the wheel speed $V_W$ is detected as will be described below. Thus, the braking forces are reduced so that the wheel speed $V_W$ is sufficiently recovered.

According to this embodiment, the average acceleration $\dot{V}_W$ of the wheel speed $V_W$ as the latter is increasing, is sought during the time period $T_5$, and the length of the next time period $T_6$ during which the first valve 2 is open, is determined based on the value of the average acceleration. More specifically, in an average acceleration computing circuit shown at 64 in FIG. 2, wheel speed $V_a$ at the time when pressure reduction is initiated (the beginning of the time period $T_4$ and wheel speed $V_{LP}$ at the time when low peak occurs (the beginning of the time period $T_5$) are sought on the basis of the wheel speed $V_W$ derived from the speed sensor 15, the output signal "4" of low peak detector 60, and the output of comparator 57. Computation is also effected to seek wheel speeds $V_a$ and $V_b$ which will be explained below, in accordance with the following equations:

$$V_b = K_1(V_a - V_{LP}) + V_{LP}$$

$$V_c = K_2(V_a - V_{LP}) + V_{LP}$$

where $0 - K_1 < K_2 < 1$.

Assume that A represents the difference $V_a - V_{LP}$ between the wheel speed $V_a$ and the low peak wheel speed $V_{LP}$. As will be appreciated from the foregoing equations, the wheel speed $V_b$ is higher than the low peak $V_{LP}$ by $K_1 \times 100\%$ of A, and the wheel speed $V_c$ is higher than the low peak $V_{LP}$ by $K_2 \times 100\%$ of A. The factors $K_1$ and $K_2$ are preset, and in a typical example, $K_1 \times 100\%$ and $K_2 \times 100\%$ may be selected to be 15% and 80% respectively.

Assuming that time $\Delta T$ is taken for the wheel speed to be increased from $V_b$ to $V_c$, the average acceleration $\overline{\dot{V}}_W$ over the time interval $\Delta T$ is given by $$\overline{\dot{V}}_W = \frac{V_c - V_b}{\Delta T}$$

In a pressure buildup time period store indicated at 65 in FIG. 2, the average acceleration is segmented in several steps, and information is stored which represents pressure buildup time periods (typically, several ms to several 10 ms) assigned to the respective steps of the segmented average acceleration. Pressure buildup time period $T_6$ that corresponds to the average acceleration $\overline{\dot{V}}_W$ derived from the unit 64, is read out of the store 65.

Time period $T_6$: When the wheel speed $V_W$ reaches high peak $V_{HP}$, a high peak detector 66 provides an output signal "5" which in turn is passed to the store 65 so that the pressure buildup time period $T_6$ corresponding to the average acceleration computed in the unit 64 is read out. The output signal of the store 65 has its polarity reversed in an inverter 67 so as to be converted to an output signal "6" which in turn appears at the output of the first OR circuit 56 through a second AND circuit 68 and the first AND circuit 62, and thus the the pressure buildup/holding signal $S_1$ disappears during the time period $T_6$. In this way, during the time period $T_6$, the first valve 2 is opened so that the brake fluid pressure P builds up.

As will be noted, the pressure buildup produced during this time period $T_6$ is the pressure buildup produced in the aforementioned former pressure buildup stage.

Description will now be made of the control operation performed during the former pressure buildup stage. This control operation is carried based on output signals "7" and "8" shown in FIGS. 2 and 3. More specifically, the wheel deceleration $\dot{V}_W$ occurring immediately before the end of the time period $T_6$ is detected by wheel deceleration detector 71, and a signal resulting from this detection is passed to a fourth and a fifth comparator 72 and 73. In the fourth comparator 72, the signal representing the wheel deceleration $\dot{V}_W$ occurring immediately before the end of the time period $T_6$ is compared with preset values "a" to "d", and based on the result of the comparison, in the next circuit 74, that piece of time information stored therein which corresponds to the above-mentioned result of the comparison is read out so that the time period during which the first valve remains closed, is determined. The output signal "7" of the circuit 74 is passed, together with the output signal "6", to a third OR circuit 75 through the AND circuit 68.

Time period $T_7$: During this time period, the signal S1 is caused to appear based on the output signal "7", so that the first valve 2 is thereby closed and thus the brake fluid pressure P is held.

In the fifth comparator 73, the wheel deceleration $\dot{V}_W$, immediately before the end of the time period $T_7$, detected by the deceleration detector 71 is compared with preset values "e" to "h". In the next circuit 76, that piece of time information previously stored therein which corresponds to the result of the comparison made by the comparator 73, is read out so that the time period during which the first valve remains open, is determined. The output of the circuit 76 has its polarity reversed in a second inverter 77 and thus is converted to an output signal "8" which in turn is passed to the third OR circuit 75 along with the output signal "7". The output of the third OR circuit 75 is passed to the second AND circuit 68 along with the output signal "6". The comparison in the comparator 72 is effected when a trigger signal is provided thereto, through a fourth OR circuit 78, from the store 65 or a circuit 76 for determining the length of the time period during which the first valve remains opened. Further, the comparison in the fifth comparator 73 is effected when a trigger signal is provided thereto from a circuit 74 for determining the length of the time period during which the first valve remains closed.

Time period $T_8$: The first valve 2 is opened in accordance with an output signal "8" which corresponds to the time period determined during the time period $T_7$ so that the brake fluid pressure P is caused to build up. Based on the deceleration speed $\dot{V}_W$ occurring immediately before the end of the time period $T_8$, the length of the next time period $T_7$ is determined during which the first valve remains closed.

As mentioned above, the length of each period in the latter pressure buildup stage is determined on the basis of the wheel deceleration occurring immediately before the beginning of said each period, and the determination is effected by reading out preset time information as was the case with the former pressure buildup stage. Needles to say, however, the contents of the time information are different between the former pressure buildup stage and the latter pressure buildup stage, and may be suitably determined by taking into consideration experimental and/or empirical results relative to each motor vehicle.

In determining the brake fluid pressure holding time period $T_7$ and brake fluid pressure buildup time period $T_8$, it is possible that one of the periods may be determined on the basis of the wheel deceleration $\dot{V}_W$ occurring immediately before the beginning of that period while the other one may be a period of a predetermined constant time length. With such an arrangement, the control procedures are simplified.

The repetition of the pressure holding and buildup time periods in the latter pressure buildup stage is continued until $G_{max}$ is detected. When $G_{max}$ is detected, control similar to that performed during the time period $T_3$ and succeeding time periods, is performed during a time period $T_9$ and succeeding time periods. In FIG. 3, $T_{10}$ indicates a time period corresponding to the pressure decreasing time period $T_4$. In case $G_{max}$ is not detected for a sufficiently long time, then the anti-skid control system is returned to its initial condition under the influence of the first time 55, second timer 59 and delay timer 63.

As will be appreciated, the above-described arrangement is advantageous, among others, in that buildup of brake fluid pressure in anti-skid control is effected in accordance with actual behavior of a wheel on a motor vehicle and yet information useful for effecting pressure buildup control is available in a simplified form so that the circuit design is facilitated.

Referring to FIGS. 4 to 7, description will next be made of another embodiment of the present invention, which is directed to an improved anti-skid control system based on the control procedure which was performed during the former pressure buildup stage in the first-mentioned embodiment of the present invention.

Figure 4:
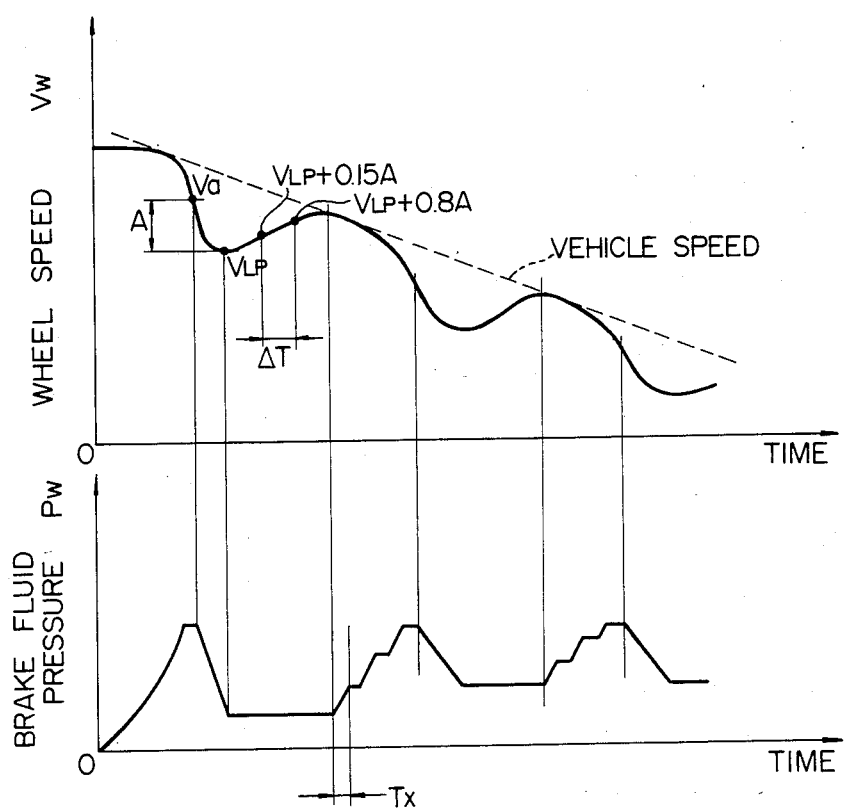
FIGS. 4 and 5 are views useful for explaining a second embodiment of the present invention.

When the transmission is operated during braking operation, for example, vibration tends to occur at the speed change gear or differential gear, and thus the time interval $\Delta T$ between low peak and high peak in the wheel speed tends to be remarkably shortened, as shown in FIG. 4. In case the time interval $\Delta T$ becomes shorter than 8 ms, for example, then it becomes difficult to accurately calculate the average acceleration which occurs during such a short period of time. When accurate calculation of the average acceleration is difficult to achieve, it may be considered, from the standpoint of safety, that the maximum of the values which are preset as the first pressure buildup time period, should be used. However, if such maximum value is used, the wheel speed $\dot{V}_W$ may suddenly drop when the road surface represents a very low coefficient of friction like a frozen road surface so that reduction of the brake fluid pressure in the next control cycle fails to be effected in time, thus causing early locking of the wheel. Thus, the second embodiment of the present invention is intended to provide an anti-skid control system capable of preventing early locking of a wheel on a road surface representing a very low coefficient of friction.

The second embodiment of the present invention is characterized in that the time interval $\Delta T$ between low peak and high peak of the wheel speed is compared with a preset time period $T_S$; when the time interval $\Delta T$ is longer than $T_S$, the first pressure buildup time period in the brake fluid pressure buildup mode in which the brake fluid pressure is increased gradually, is determined on the basis of the average acceleration over the time interval $\Delta T$ as in the first-mentioned embodiment; when the time interval $\Delta T$ is equal to or shorter than $T_S$, the aforementioned first pressure buildup time period $T_x$ is selected to be equal to the pressure buildup time period $T_x'$ which was determined in the preceding control cycle. In the case where the pressure buildup time period is the initial one, the pressure buildup time period $T_x$ is selected to be equal to a preset initial value $T_o$.

The anti-skid control system according to the second embodiment of this invention will now be described in detail with reference to FIGS. 5 to 7.

Figure 5:
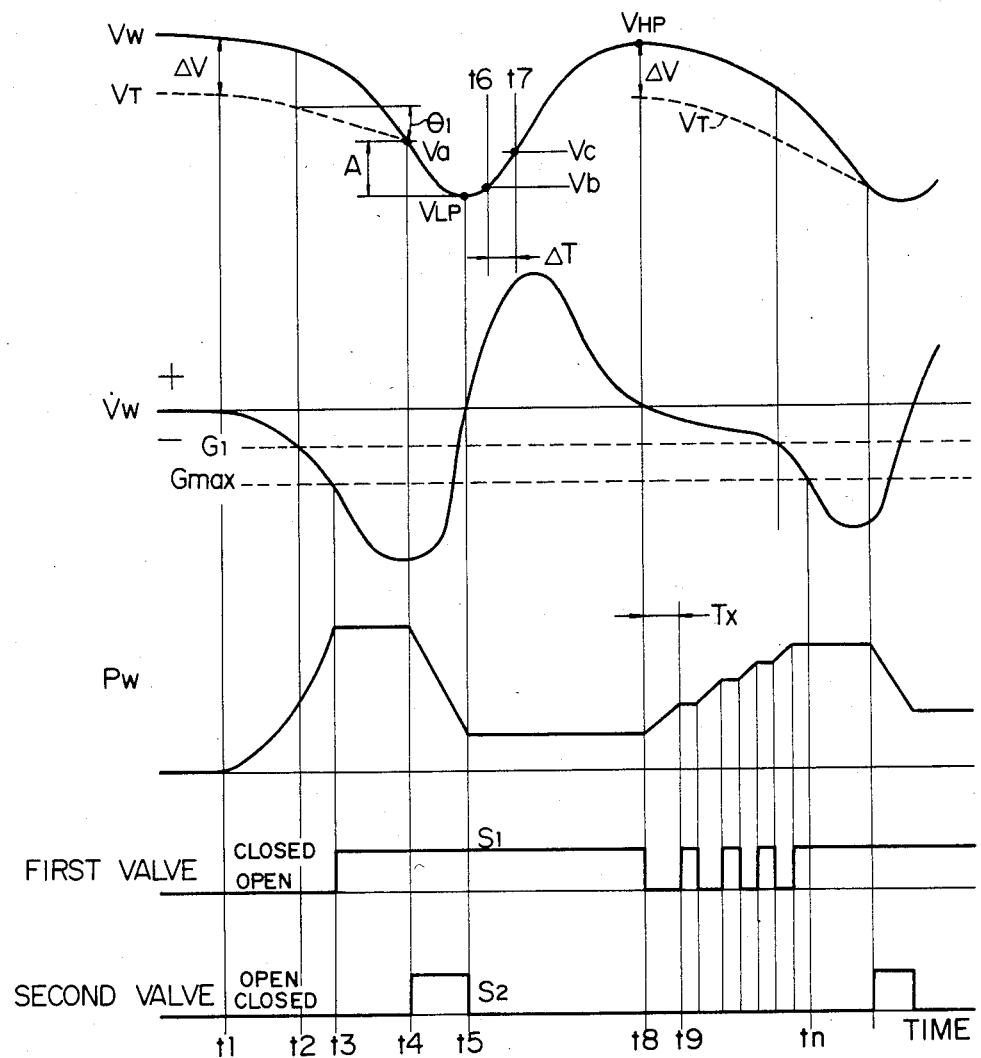

FIG. 5 illustrates the relationship between variation in the wheel speed $\dot{V}_W$, wheel acceleration and deceleration $\dot{V}_W$ and brake fluid pressure $P_w$ and the opening and closing operations of a solenoid-operated pressure buildup valve (referred to as "first valve" hereinafter) and solenoid-operated pressure reduction valve (referred to as "second valve" hereinafter). FIG. 6 is a block diagram showing a control circuit for operating the first valve.

In such a stage that the first valve remains open while the second valve remains closed, the brake fluid pressure $P_w$ builds up from a starting point $t_1$, so that the wheel speed drops and thus the wheel deceleration increases gradually. Reference velocity $V_T$ varies following the wheel speed $\dot{V}_W$ with a constant speed difference $\Delta V$ maintained therebetween. The wheel speed $\dot{V}_W$ is detected by a wheel speed sensor 101 (FIG. 6) associated with the wheel. At time $t_2$, the wheel deceleration $\dot{V}_W$ reaches a preset threshold level $G_1$, and thereafter the reference velocity $V_T$ is reduced with a constant gradient.

As the wheel deceleration $\dot{V}_W$ increases further, it reaches another preset threshold level $G_{max}$ at time $t_3$, and thereupon the first valve is closed so that the brake pressure $P_w$ is held. The threshold level $G_{max}$ is set for the purpose of preventing the brake fluid pressure from building up beyond a prescribed level.

The wheel speed $\dot{V}_W$ drops abruptly and crosses the reference velocity $V_T$ at time $t_4$, and thereupon the second valve is opened so that reduction of the brake fluid pressure is started. The wheel speed $V_a$ at the time $t_4$ when the brake pressure reduction is started, is stored in a store 102 which is arranged to be set by signal for opening the second valve and reset by signal for closing the second valve. The reduction of the brake fluid pressure is continued until $t_5$ when the wheel speed $\dot{V}_W$ reaches a low peak, and at the time $t_5$, the second valve is closed so that the brake fluid pressure $P_w$ is held. The low peak time $t_5$ is detected by a low peak detector 103, and the wheel speed $V_{LP}$ at the time $t_5$ is stored in a store 104 which is arranged to be reset by signal for closing the second valve. The wheel speed $V_a$ and $V_{LP}$ are read out of the stores 102 and 104 respectively. In a subtractor 105, the wheel speed $V_{LP}$ is subtracted from the wheel speed $V_a$ to seek the speed difference A ($=V_a-V_{LP}$). Subsequently, quantities equal to 15% and 80% of the speed difference A are calculated in multipliers 106 and 107 respectively. The quantities thus calculated are then added to the low peak wheel speed $V_{LP}$ in adders 108 and 109 respectively, and in this way, the below-mentioned wheel speed $V_b$ and $V_c$ are calculated.

From the low peak time $t_5$, the wheel speed $V_W$ is accelerated, and during this acceleration, the wheel speed $V_W$ and the above-calculated speeds $V_b$ ($=V_{LP}+0.15\times A$) and $V_c$ ($=V_{LP}+0.8\times A$) are compared in comparators 110 and 111 respectively. The time interval $\Delta T$ between time $t_6$ when $V_W=V_b$ and time $t_7$ when $V_W=V_c$, is measured by a timer 112 which is designed so as to start counting on the basis of the output of the comparator 110 which occurs when $V_W\geq V_b$ and stop counting on the basis of the output of the comparator 111 which occurs when $V_W\geq V_c$. The time interval $\Delta T$ is compared with a preset quantity $T_s$ ($=8$ ms) in a comparator 113.

The time points $t_6$ and $t_7$ at the ends of the time interval $\Delta T$ are detected by an AND gate 114 and then provided to an average acceleration calculating unit 115. The wheel speed $V_W$ is provided to the average acceleration calculating unit 115 all the time, and thus in this unit 115, the average acceleration $\ddot{V}_W=(V_c-V_b)/\Delta T$ over the time interval $\Delta T$ is calculated from the wheel speed $V_b$ at the time $t_6$, the wheel speed $V_c$ at the time $t_7$, and the time interval $\Delta T$. The result of this calculation is stored in an acceleration store 116 which is also arranged to be reset by signal for opening the second valve.

The wheel speed $V_W$ increases from the low peak at the time $t_5$, further goes up beyond $V_b$ at the time $t_6$ and $V_c$ at the time $t_7$, and reaches low peak $V_{HP}$ at time $t_8$; thereupon the first valve is opened. Thereafter, the first valve is opened and closed with mincing steps; thus, a pressure buildup control mode is started wherein the brake fluid pressure is increased relatively gradually. At the time $t_8$ when the wheel speed $V_W$ reaches the high peak, the average acceleration $\ddot{V}_W=(V_c-V_b)/\Delta T$, which is stored in the acceleration store 116, is now read out and provided to a pressure build up time period selector circuit 117 in which set values for the first pressure buildup time period $T_x$ beginning with the time $t_8$ in the above-mentioned pressure buildup control mode, are stored, in relation to the average acceleration $V_W=(V_c-V_b)/\Delta T$, as shown in Table I, for example.

TABLE I

| Average acceleration $\overline{V}_W$ (g) | Pressure buildup time period $T_x$ (ms) |
|---|---|
| Lower than 5 | 6 |
| 5–7 | 10 |
| 7–9 | 30 |
| Higher than 9 | 50 |

As mentioned above, the time interval $\Delta T$ between the time points $t_6$ and $t_7$ when the wheel speed $V_W$ is increasing, is compared with the preset quantity in the comparator 113, and when $\Delta T>8$ ms, the output of the comparator 113 is passed to the pressure buildup time period selector circuit 117, and only when the selector 117 is provided with the output of the comparator 113, the pressure buildup time period $T_x$ as specified in Table I is read out of the selector 117 so that the first pressure buildup time period from the time $t_8$ to time $t_9$ is determined. As a result, the first valve 118 is operated so that buildup of the brake fluid pressure is started.

Figure 6:
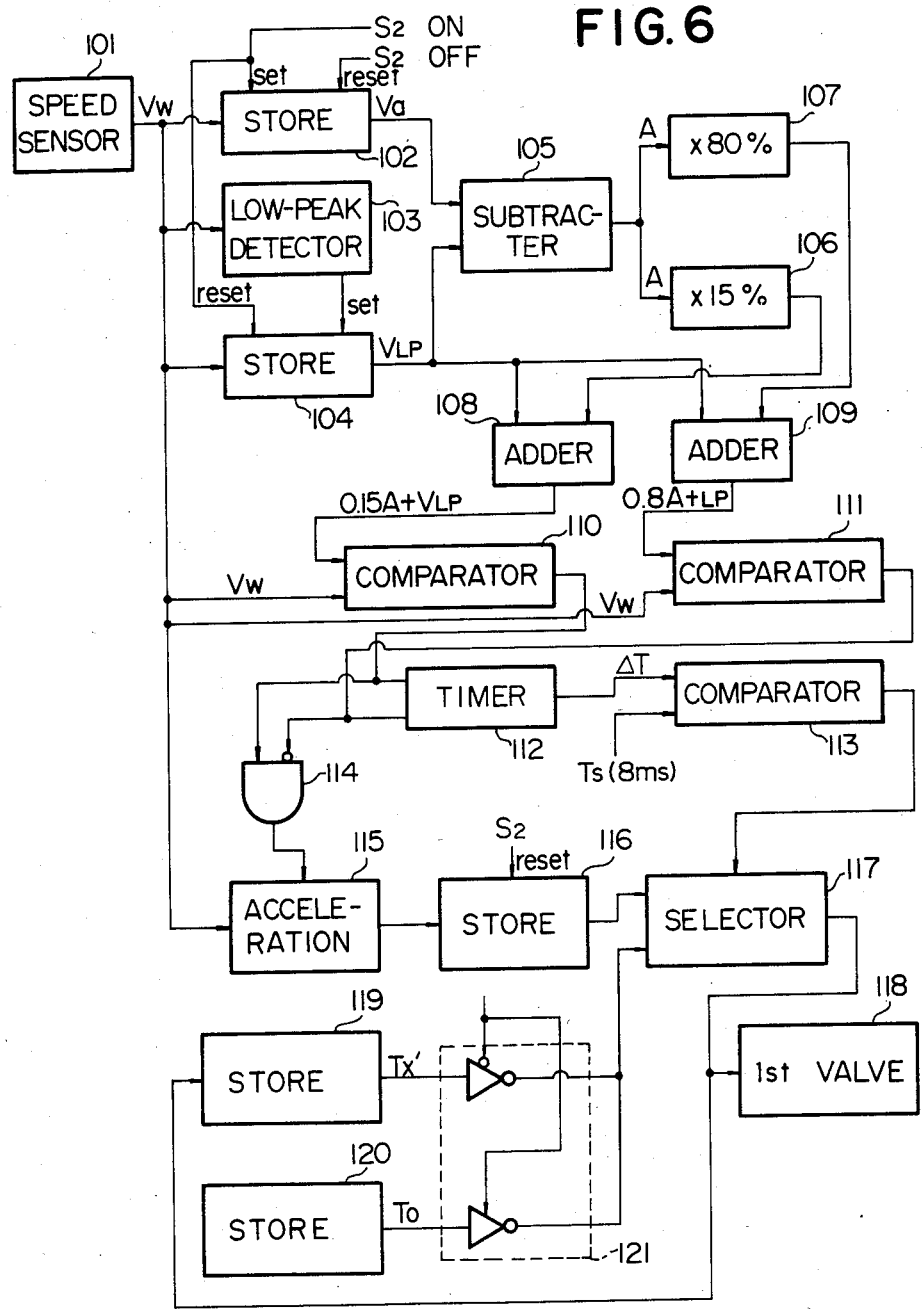
FIG. 6 is a block diagram illustrating the second embodiment of the present invention.

As shown in FIG. 6, there are also provided a store 119 for storing the pressure buildup time period $T_x'$ which was determined at the preceding control cycle, and another store 120 for storing the preset initial value $T_o$ for the pressure buildup time period. These stores 119 and 120 are connected to the pressure buildup time period selector circuit 117 through a switching circuit 121. When the output of the comparator 113 is not provided to the pressure buildup time period selector circuit 117, i.e., when $\Delta T \leq 8$ ms, the selector 117 is provided with the output of one of the stores 119 and 120. In this case, when the currently prevailing control cycle is the initial one, information representing the pressure buildup time period $T_o$ read out of the store 120 is passed to the first valve 118 through the pressure buildup time period selector circuit 117. When the currently prevailing control cycle is the second or later one, information representing the pressure buildup time period $T_x'$ in the preceding control cycle which was read out of the store 119, is passed to the first valve 118 through the pressure buildup time period selector circuit 117.

Upon termination of the first pressure buildup started at the time $t_8$ on the basis of the pressure buildup time period $T_x$ thus determined, i.e., at the time point $t_9$, the first valve 118 is closed so that the brake fluid pressure is held and thus control operation similar to that in the latter pressure buildup stage in the first-mentioned embodiment is started. The length of the first pressure holding time period beginning with the time $t_9$ is determined on the basis of the wheel deceleration $V_W$ detected immediately before the first pressure buildup time period terminates. Thus, the first valve is opened again so that the second pressure buildup is started. The length of the second pressure buildup time period is determined on the basis of the wheel deceleration $V_W$ detected immediately before the first pressure holding time period terminates. In this way, the first valve is opened and closed with mincing steps so that the brake fluid pressure builds up gradually.

Table II shows an example of preset values for the pressure buildup time period and pressure holding time period which may be used at and later than the time in relation to the wheel deceleration $\dot{V}_W$ detected immediately before the beginning of each of the periods.

TABLE II

| Wheel deceleration $\dot{V}_W$ (g) | Pressure holding time period (ms) | Pressure buildup time period (ms) |
|---|---|---|
| Lower than 2 | 16 | 7 |
| 2–4 | 22 | 6 |
| 4–6 | 28 | 5 |
| Higher than 6 | 34 | 4 |

The repetition of the opening and closing operations of the first valve is continued until the threshold level Gmax is detected next; if the threshold level $G_{max}$ is detected at time $t_n$, then a control cycle similar to the control cycle started at the time $t_3$ will be started at the time $t_n$.

In case $G_{max}$ is not detected within a prescribed time period, then the anti-skid control is returned to the initial condition.

Figure 7:
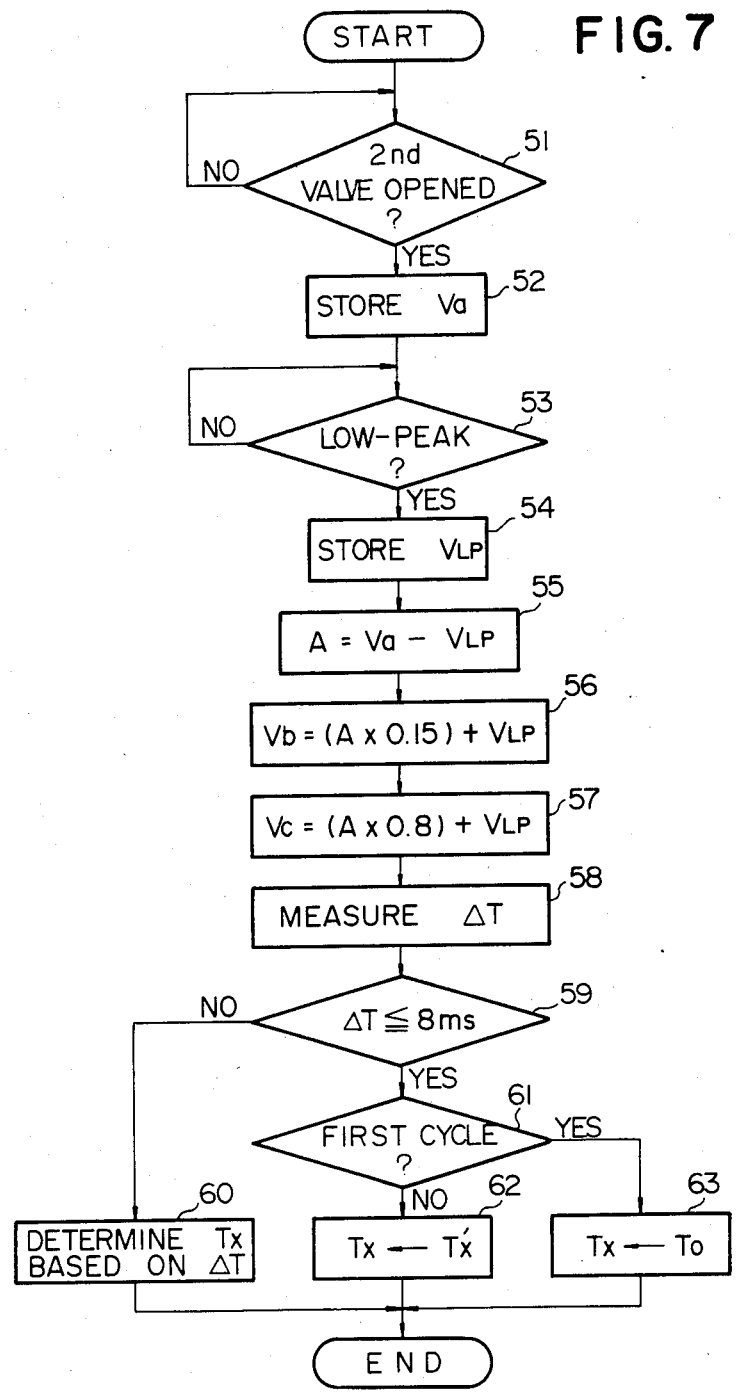
FIG. 7 is a flow chart useful for explaining the operation of the circuit shown in FIG. 6.

FIG. 7 shows a flow chart useful for explaining the control operation performed for determining the length of the first pressure buildup time period $T_x$ in the control circuit of FIG. 6. This control is executed with a predetermined cyclic period (4 ms, for example). First, at step 51, judgment is made as to whether or not the second valve is opened. If the result is NO, then this judgment is repeated, while the result is YES, the control advances to step 52 where the wheel speed $V_a$ at the time when the second valve is opened, i.e., at the time $t_4$ when reduction of the brake fluid pressure $P_w$ is started, is stored. Subsequently, at step 53, judgment is made as to whether or not a low peak of the wheel speed $V_W$ is detected. If the result is NO, this judgment is repeated, while the result is YES, then the control advances to step 54 where the wheel speed $V_{LP}$ at the low peak time $t_5$ is stored. At step 55, the difference A ($=V_a-V_{LP}$) between the two wheel speeds $V_a$ and $V_{LP}$ is calculated. At step 56, the speed difference $A\times15\%$ is calculated and the result is added to the wheel speed $V_{LP}$ at the low peak time $t_5$ so that the wheel speed $V_b$ is determined. Further, at step 57, the speed difference $A\times80\%$ is calculated, and the result is added to the wheel speed $V_{LP}$ so that the wheel speed $V_c$ is determined. At the next step 58, the time interval $\Delta T$ in which the wheel speed is changed from $V_b$ to $V_c$, is measured. At step 59, the time interval $\Delta T$ is compared with 8 ms to determine whether T is shorter than 8 ms. If the result is NO, the first pressure buildup time period $T_x$ is determined on the basis of the average acceleration $\overline{V}_W=(V_c-V_b)/\Delta T$ at step 60 (see Table I). If the result of the judgment at the step 59 is YES, then at the step 61, judgment is made as to whether or not the currently prevailing control cycle is the initial one; if the result is YES, the preset initial value $T_o$ is selected as the first pressure buildup time period, while the result is NO, then the pressure buildup time period $T_x'$ determined in the preceding control cycle is selected as the first pressure buildup time period.

As will be appreciated from the above discussion, according to the second embodiment of the present invention, in pressure buildup mode which occurs after brake fluid pressure reduction-control mode and in which holding operations are repeated with mincing steps so that the brake fluid pressure builds up gradually, the first pressure buildup time period can be easily determined so as to be adaptable for the coefficient of friction between the wheel and the road surface. Thus, it is possible to achieve improved steering performance and running stability during braking operation, irrespective of the road surface condition. It is also possible to shorten the brake stopping distance. From this, it will be appreciated that the system of the present invention is most effectively applicable in anti-skid control with respect to a road surface with a very low coefficient of friction.

While the present invention has been illustrated and described with respect to specific embodiments thereof, it is to be understood that the present invention is by no means limited thereto but encompasses all changes and modifications which will become possible within the scope of the appended claims.

We claim:

1. In an anti-skid control system for a motor vehicle, including a brake fluid pressure reduction-control mode and a brake fluid pressure buildup-control mode, each of which occurs cyclically, wherein in said reduction-control mode, reduction of the brake fluid pressure is started on the basis of detection of an abrupt drop in wheel speed which occurs when a wheel of the vehicle is braked; and in said buildup-control mode, valve means is repetitively opened and closed so that brake fluid pressure buildup and holding operations are performed alternately and repetitively, whereby the brake fluid pressure is caused to buildup gradually, the improvement comprising:

means for determining the length of time period for the first one of said pressure buildup operations in said buildup-control mode, on the basis of variation in the wheel speed occurring during a period of time between a low peak point and a high peak point, said period of time being determined in relation to the difference between the wheel speed at a point of time when reduction-control of brake fluid pressure is to be started, and said low peak point;

means for determining a point of time when reduction-control of brake fluid pressure is to be started, on the basis of detection of an abrupt drop in the wheel speed which occurs when the wheel is braked;

means for detecting the wheel speed $V_a$ at said point of time when reduction-control of brake fluid pressure is to be started;

means for detecting a low peak point when the wheel speed is changed from deceleration to acceleration by the reduction-control of brake fluid pressure which is started from said point of time when reduction-control of brake fluid pressure is to be started;

means for detecting the wheel speed $V_{LP}$ at said low peak point;

means for calculating the speed difference A between said wheel speeds $V_a$ and $V_{LP}$;

means for detecting a first point of time when said wheel speed is increased from the speed $V_{LP}$ at the low peak point to a speed $V_b$ which is higher than said speed $V_{LP}$ by a quantity corresponding to $K_1 \times 100\%$ of said speed difference A, where $K_1$ is a preset value that is greater than zero but smaller than unity;

means for detecting a second point of time when the wheel speed is increased from the speed $V_{LP}$ at said low peak point to a speed $V_c$ which is higher than the speed $V_{LP}$ by a quantity corresponding to $K_2 \times 100\%$ of said speed difference A, where $K_2$ is a preset value that is greater than zero but smaller than unity;

means for calculating average acceleration $(V_c - V_b)/\Delta T$, where $\Delta T$ is the time interval from said first point of time to said second point of time; and means for determining the length of time period $T_x$ for the first pressure build operation in said brake fluid pressure buildup-control mode, on the basis of said average acceleration.

2. An anti-skid control system according to claim 1, wherein said means for determining the length of time period $T_x$ includes means for storing a plurality of pieces of time information which correspond to a plurality of quantities for the average acceleration respectively, said means for determining being adapted to select and read that piece of time information which corresponds to the calculated value for the average acceleration, out of said storing means, thereby determining the length of time period $T_x$.

3. An anti-skid control system according to claim 1, wherein $K_1$ is 0.15 and $K_2$ is 0.80.

4. An anti-skid control system according to claim 1, further comprising:

means for comparing the time interval $\Delta T$ between said first point of time and said second point of time with a preset time period $T_s$;

means operative, when the result of said comparison indicates that $\Delta T > T_s$, to determine the length of time period $T_x$ for the first pressure buildup operation in said buildup control mode, on the basis of the average acceleration over the time interval $\Delta T$;

means operative, when the result of said comparison indicates that $\Delta T \leq T_s$ and when said pressure buildup-control mode is an initial one, to determine said time period $T_x$ to be equal to a preset initial value $T_o$; and means operative, when the result of said comparison indicates that $\Delta T \leq T_s$ and when said pressure buildup-control mode is a second or succeeding one, to determine said time period $T_x$ to be equal to the length of time period $T_x'$ for the first pressure buildup operation in the preceding buildup-control mode.

5. An anti-skid control system according to claim 4, wherein said time period $T_s$ is selected to be 8 ms.

* * * * *